March 7, 1961  E. M. RAMBERG ET AL  2,973,975
REUSABLE FITTING FOR BRAID-COVERED HOSE
Filed Oct. 31, 1957
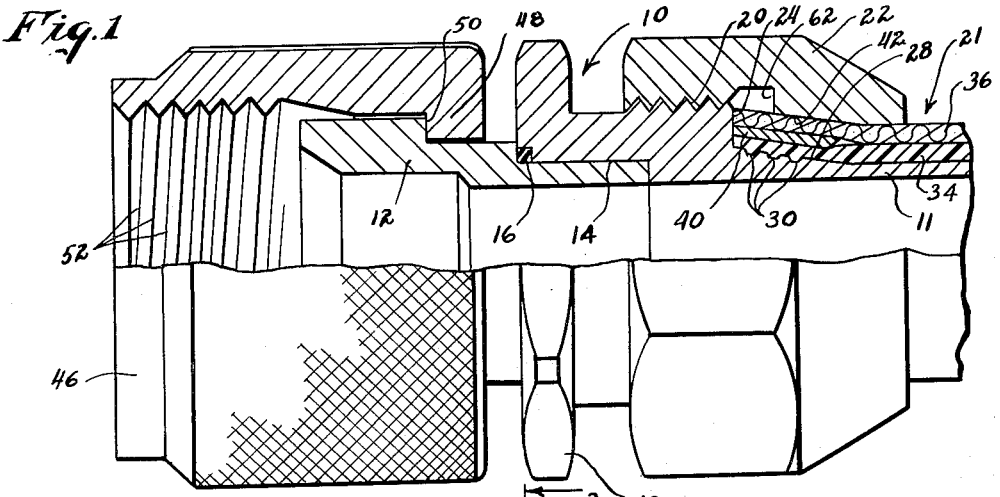
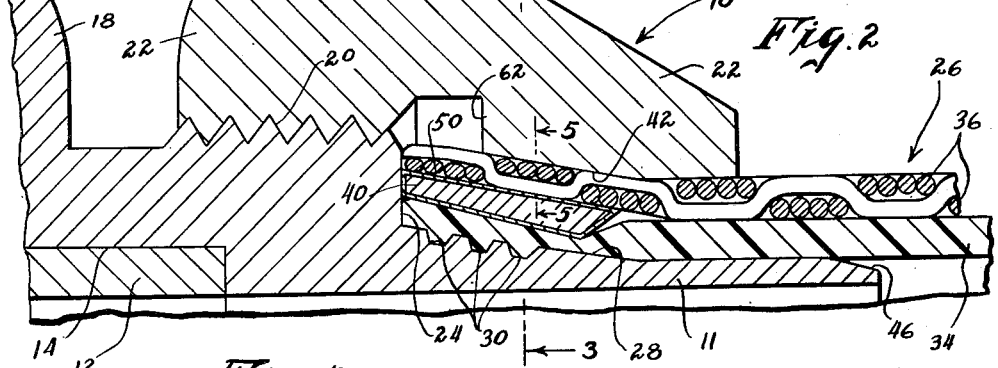
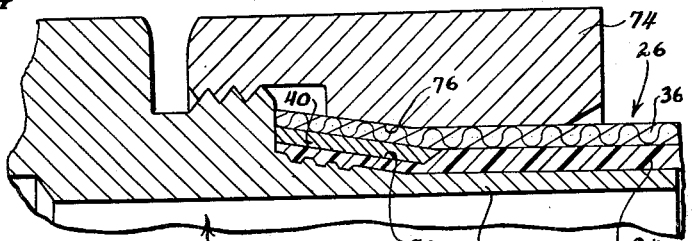
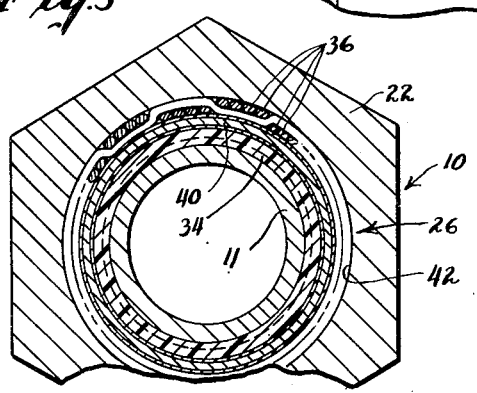
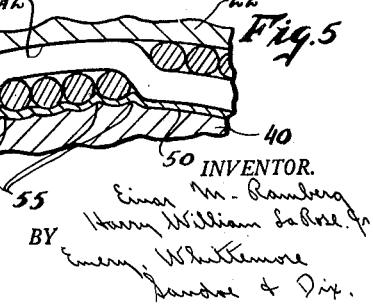
INVENTOR.
Einar M. Ramberg
Harry William LaRose Jr.
BY
Emery, Whittemore,
Sandoe & Dix
ATTORNEYS United States Patent Office 2,973,975
Patented Mar. 7, 1961

2,973,975
REUSABLE FITTING FOR BRAID-COVERED HOSE
Einar M. Ramberg and Harry William La Rose, Jr., Longmeadow, Mass., assignors to Titeflex, Inc., Springfield, Mass., a corporation of Massachusetts
Filed Oct. 31, 1957, Ser. No. 693,568
9 Claims. (Cl. 285—149)

This invention relates to fittings such as are used for connecting a hose to a fluid line. Such fittings generally have means for clamping them to the end of a hose, and have detachable fastening means such as threaded nuts for holding the fitting on a threaded end of a fluid line to which it is connected.

It is an object of this invention to provide an improved end fitting for use wtih braid-covered flexible hose, and more especially Teflon hose. "Teflon" is the designation used by the Du Pont Company for polytetrofluoroethylene. This material has very unusual characteristics and has proven itself to be the best plastic material for use in flexible, high-pressure hose lines.

Another object of the invention is to provide an end fitting of the character described with a metal-to-metal seal at the end of the hose provided by a ring which also serves as a positive braid lock for securing the braid of the hose in the end fitting. Another object of this fitting is to provide an effective mechanical means of crimping or reducing the thickness of the Teflon in the area of the fitting.

Features of the invention relate to a construction in which the connection of the hose to the fitting is made more secure by a slightly deformable ring inserted into the fitting in contact with the hose, and preferably interposed between the outside of the hose and the inside of the braid which covers the hose.

Other features of the invention relate to the shape of the ring and its correlation with the adjacent faces of the fitting so as to compress the plastic hose to a greater degree at a distance remote from the end face of the hose, and with control of the degree of compression so as to obtain a particularly effective seal with Teflon hose.

Other objects, features and advantages of the invention will appear or be pointed out as the description proceeds.

In the drawing, forming a part hereof, in which like reference characters indicate corresponding parts in all the views:

Figure 1 is a side view, partly in section and partly in elevation, showing the end fitting assembly of this invention secured to a braid-covered Teflon hose;

Figure 2 is a fragmentary sectional view, on a greatly enlarged scale, of a portion of the end fitting assembly sown in Figure 1;

Figure 3 is a sectional view through the fitting assembly shown in Figures 1 and 2, the section being taken at the region of the section line 3—3 of Figure 2 but the section being on a smaller scale than Figure 2;

Figure 4 is a fragmentary sectional view through a modified form of the invention; and Figure 5 is a greatly enlarged sectional view taken on the line 5—5 of Figure 2.

The construction shown in Figure 1 includes a fitting having a body portion 10 with an integral, tubular insert 11 at one end and a fluid line connector 12 at the other end; the fluid line connector being secured to the remainder of the body portion 10 by brazing 14 or other connecting means. In the construction illustrated, space 16 is provided for an internal brazing ring used to join the connector 12 to the other part of the body portion 10.

The body portion 10 has a flange 18 with a plurality of flat sides for receiving a wrench. The body portion 10 also has threads 20 for receiving a clamping nut 22; and it has a shoulder 24 for limiting the extent to which the insert 11 can be pushed into a hose 26.

The forward portion of the tubular insert 11, just ahead of the shoulder 24, diverges toward the shoulder to obtain a tapered face which flares the end portion of the hose 26 after the insert 11 is pushed into the hose for the full length of the insert. This diverging surface or tapered face of the tubular insert is indicated generally by the reference character 28.

The hose 26 includes a flexible Teflon tube 34 covered by a woven metal braid 36. This braid may be made of either round wire or relatively flat strips, both kinds of strands being commonly used for braids that surround a plastic tube.

There are preferably circumferential grooves 30 in this tapered face 28 for improving the grip which the fitting exerts on the plastic tube 34.

A ring 40 of frusto-conical shape surrounds the portion of the tube 34 and this ring 40 is preferable located between the Teflon tube 34 and the woven metal braid 36. The clamping nut 22 has an inside surface 42 which is tapered and parallels the tapered surface on the insert 11.

At the other end of the fitting assembly, there is a nut 46 (Fig. 1), having a lip 48 extending behind a shoulder 50 on the fluid line connector 12. The flange 18 prevents the nut 46 from moving toward the right for any substantial distance in Figure 1, and the shoulder 50 prevents the nut 46 from coming off the fitting in a direction toward the left in Figure 1. Although the nut 46 is free to rotate on the body portion 10, the construction shown makes the nut 46 captive; but the nut 46 has threads 52 which can be screwed over a threaded end of a fluid line to pull the body portion 10 into tightly-assembled relation with the fluid line, in accordance with conventional practice. Although we have described only one type of coupling end termination, many other methods of coupling may be used, such as male pipe thread, male 37° seat, elbows and fixed or swivel flanges.

Figure 2 shows the construction of the hose-clamping end of the fitting on an enlarged scale and more clearly. The end of the insert 11 has a tapered surface 46 which makes ti easier to push the insert 11 into the hose 26. Beyond this tapered face 46, the insert 11 is a snug and fairly tight fit in the tube 34.

When the tapered surface 28 of the insert 11 is pushed into the Teflon tube 34, the end of the tube is stretched and flared; and when the insert 11 is pushed into the hose for the full length of the insert, the shoulder 24 of the insert 11 comes against the end face of the tube 34. The Teflon extends part way into the grooves 30 when the insert 11 is initially forced into the tube 34, but it is not until compressive pressure is applied to the hose that the Teflon is forced down into the full depth of the grooves 30.

The ring 40 has to be inserted between the braid 36 and the Teflon tube 34 before the insert 11 is pushed into the hose; but the ring 40 is of frusto-conical shape so that it expands the braid 36 and leaves clearance for flaring of the end of the Teflon tube 34. In the construction shown in Figures 1 and 2, the axial length of the rings 40 is somewhat less than the axial length of the tapered face 28 on the insert 11, and the thickness of the ring 40 is somewhat greater at its end remote from the shoulder 24.

The ring 40 is preferably made of steel and it is thin enough to form crimps 55 (Figure 5) when compressed so as to reduce its circumferential extent. The crimps are formed in a generally axial direction. Other metals can be used for the ring 40 but it is a feature of the invention that the material is strong and that it provides a tight lock for the braid when forced into intimate contact with the braid and more especially when crimped into recesses or clearances between strands of the braid.

The ring 40 is preferably plated with some other material from that of which it is made, and with a material different from that of the shoulder 24. The material applied to the outside surface of the ring 40, preferably by plating, is a soft material, in the preferred embodiment; and this plated material is designated by the reference character 50 in Figure 2. It will be understood that the ring is preferably plated in the other views of the drawing but the scale is not large enough to show the plating.

The material on the outside surface of the ring 40 is copper, silver, cadmium or similar soft metal. By having this metal 50 different from the metal of the shoulder 24, galling of the ring on the shoulder 24 is avoided when the ring is clamped tightly against the shoulder. This is important in a reusable fitting because it leaves the surface of the shoulder 24 smooth and insures a tight metal-to-metal seal between the shoulder 24 and any subsequently used ring 40 which may be brought against the shoulder 24 with repeated uses of the fitting for new hoses.

The opening through the nut 24, which is of uniform diameter, fits over the braid 36 with a running or sliding fit. The tapered surface 42 on the inside of the clamping nut 22 is preferably at a uniform clearance throughout its area from the confronting face 28 on the insert 11; but it is not essential that these clamping surfaces be at uniform clearance from one another. The nut 22 is, of course, placed on the hose 26 before the braid 36 is flared by the ring 40 and the end of the hose is flared by insert 11. Taper of insert 11 further allows the use of hose with greater diameter tolerances than could be used with a straight tube insert.

As the clamping nut 22 is screwed over the threads 20 and advances axially, the tapered face 42 moves into contact with the flared portion of the braid 36 and continued movement of the clamping nut forces the braid 36 firmly against the outside of the ring 40 and forces the ring 40 against the shoulder 24 and against the outside surface of the Teflon tube 34.

The pressure of the ring 40 against the shoulder 24 provides a tight metal-to-metal seal at the end of the hose and the ring 40 yields by having its circumference break into crimps 55, as shown in Figure 5.

Because of the smaller diameter of the insert 11 (Figure 2) at the end of the tapered surface 28 remote from the shoulder 24, there is less volume of space between the ring 40 and the insert 11 at the right-hand end of the ring in Figure 2, even though the clearance between the inside face of the ring 40 and the insert face 28 is equal over their entire areas. Therefore, as the ring 40 is reduced in diameter by increasing pressure from the clamping nut 22, the Teflon of the tube 34 is compressed to a greater extent under the smaller end of the ring, and this causes a pressure and flow of Teflon toward the left in Figure 2 as the compression of the Teflon under the ring 40 increases.

In the construction illustrated, the Teflon is compressed to about 60% of its original volume with the compression greatest at the end of the ring 40 which is remote from the shoulder 24, as already explained.

As the clamping nut 22 is screwed along the threads 20, it obtains a great mechanical advantage to clamp the hose because of the low angle of the faces 28 and 42 with respect to the direction of movement of the clamping nut 22 axially of the fitting. These faces 28 and 42 make an angle of preferentially 7° to 11° with the longitudinal axis of the fitting but need not be restricted to this narrow range of angularity. The taper of the ring 40 is also preferably within this same range of about 8° to 10°.

The tapered face 42 of the clamping nut 22 does not extend as far as the face 28 of the insert 11. There is, therefore, an annular clearance around the outside of the braid 36 and for some distance back from the end of the braid. This clearance extends as far as a shoulder 62 which is at the end of the tapered surface 42. When the braid 36 is clamped by the surface 42 of the clamping nut, therefore, there is no radial pressure exerted against the braid beyond the shoulder 62 and this further increases the locking of the braid in the fitting because the braid is urged toward the left in Figure 2 by the action of the clamping nut 42 and tends to expand into the clearance ahead of the shoulder 62.

Figure 4 shows a modified construction in which the hose 26 fits over an insert 71 extending from a body portion 72 of a fitting which is similar to that shown in Figures 1–3 except for the shape and size of the part. The only difference in principle between the construction shown in Figure 4, and that shown in the other figures, is that a clamping nut 74 has a tapered clamping surface 76 extending axially beyond a confronting clamping face 78 on the insert 71. The ring 40 is located between the braid and the Teflon tube 34 is in the other figures of the drawing and in Figure 4 extends beyond the end of the tapered surfaces 76 and 78.

With this construction, the inside surface of the ring 40 converges toward the outside surface of the insert 71 along the portion of the insert which is beyond the tapered surface 78 and this results in a tighter clamping of the Teflon tube 34 toward the right-hand end of the ring 40. Otherwise the construction shown in Figure 4 is similar to that shown in the other figures of the drawing.

The preferred construction and one modification of the invention has been illustrated and described, but changes and other modifications can be made and some features can be used in different combinations without departing from the invention as described in the claims.

What is claimed is:

1. A reusable end fitting for braid-covered plastic hose including a body portion having an insert at one end integral therewith for insertion into a hose, the insert having one part that has a cylindrical outside surface that fits snugly into the hose, and the insert having another part between its cylindrical part and said body portion of the fitting, the other part having an outside surface that diverges toward the end of the hose, a clamping nut that screws over the threads formed on the outside of the body portion, the clamping nut surrounding the insert and having a surface extending to the end of the diverging surface and along part of the cylindrical surface of the insert, the nut having a diverging clamping face, and a ring of generally frusto-conical shape between the diverging surface of the insert and the clamping face of the nut and located between the hose and the braid of the hose, the inside surface of the ring having its minimum diameter adjacent to the end of the ring remote from the end of the hose, the ring being closest to the insert at said minimum diameter and the inside surface of the ring flaring outwardly beyond said minimum diameter, the ring being of malleable metal and deformed radially to smaller diameter by a radial component of the clamping pressure developed by axial movement of the nut as it is screwed along the threads of the body portion.

2. The end fitting described in claim 1 and in which there is a shoulder on the body portion where the insert is joined thereto and at the large end of the diverging outside surface of the insert, and the diverging clamping face of the nut, are equally spaced from one another across substantial areas of their confronting faces, and the ring clamped between the confronting faces is of greater radial thickness at its end remote from the end of the hose than at the end adjacent to the shoulder, whereby the hose is more tightly clamped at a region spaced from the end of the hose.

3. The end fitting described in claim 1 and in which the outside surface of the ring is plated with soft metal, and the strands of the braid are indented into the soft metal by the clamping pressure of the nut.

4. The reusable hose fitting assembly described in claim 3 and in which the ring is plated with soft metal from the group consisting of copper, silver and cadmium.

5. The reusable hose fitting assembly described in claim 1, and in which the taper of the insert and the taper of the face of the clamping nut are each between seven and eleven degrees to the longitudinal axis of the hose and insert.

6. The reusable hose fitting assembly described in claim 1 and in which the ring has crimped portions and the crimped portions are embedded in some of the spaces between the strands of the braid to provide a positive braid lock.

7. The reusable end fitting described in claim 1 and in which there is a shoulder at the end of the insert and against which the ends of the hose and ring abut, and the ring is longer than the diverging portion of the insert so that the ring compresses the hose against the cylindrical portion of the insert with more force at the end of the ring which is remote from the shoulder.

8. The reusable end fitting described in claim 1 and in which there are generally circumferential grooves in the diverging surface of the insert which contacts with the inside surface of the hose.

9. The reusable end fitting described in claim 1, and in which the ring is shorter than the diverging surface of the insert.

References Cited in the file of this patent

UNITED STATES PATENTS

| | | |
|---|---|---|
| 954,549 | Turner | Apr. 12, 1910 |
| 959,702 | Blanchard et al. | May 31, 1910 |
| 2,273,398 | Couty | Feb. 17, 1942 |
| 2,363,586 | Guarmaschelli | Nov. 28, 1944 |
| 2,428,189 | Wolfram | Sept. 30, 1947 |
| 2,467,520 | Brubaker | Apr. 19, 1949 |
| 2,757,945 | Bingham | Aug. 7, 1956 |
| 2,787,289 | Press | Apr. 2, 1957 |
| 2,809,056 | Kaiser | Oct. 8, 1957 |

FOREIGN PATENTS

| | | |
|---|---|---|
| 29,614 | Great Britain | Dec. 31, 1904 |